Sept. 27, 1966    R. W. KERN    3,274,883
OPTICAL ANGULAR ORIENTATION MEASURING SYSTEM
Filed March 15, 1961    3 Sheets-Sheet 1
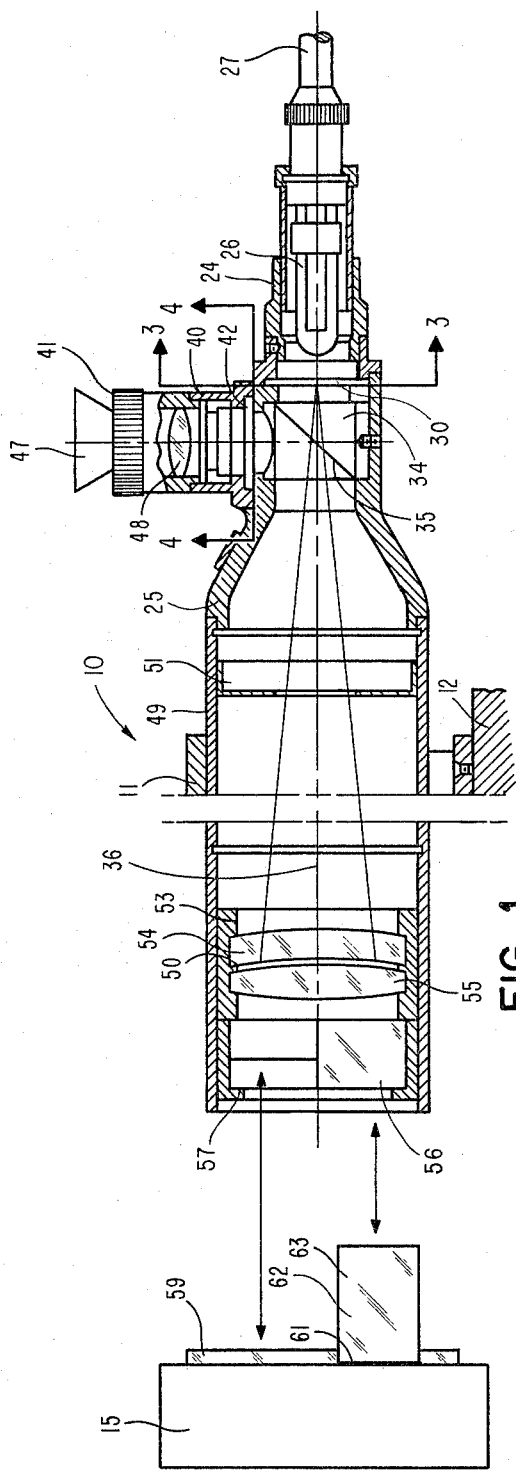
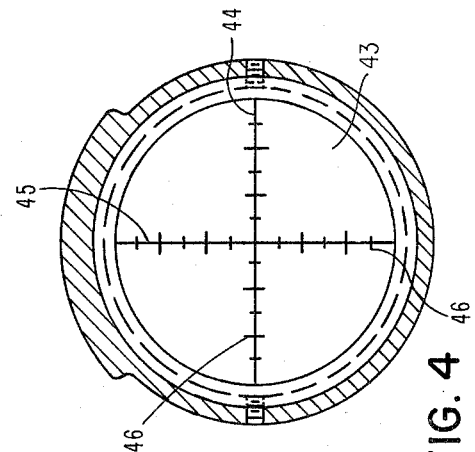
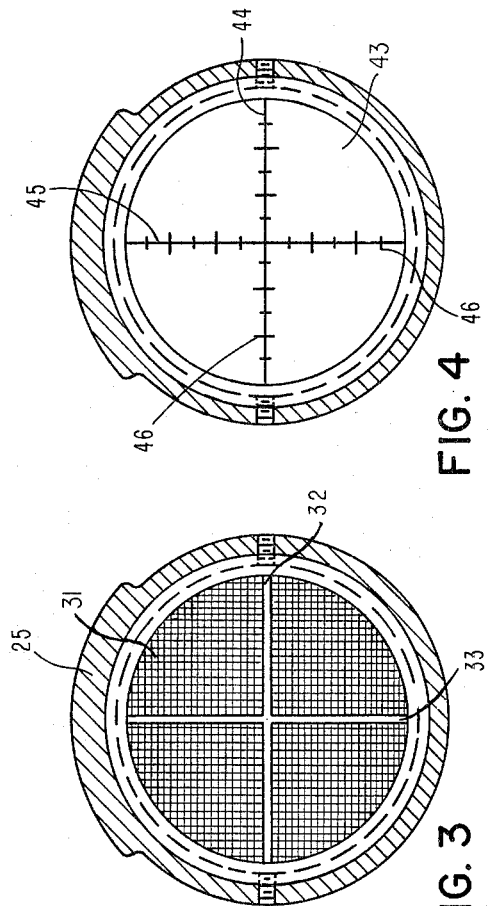
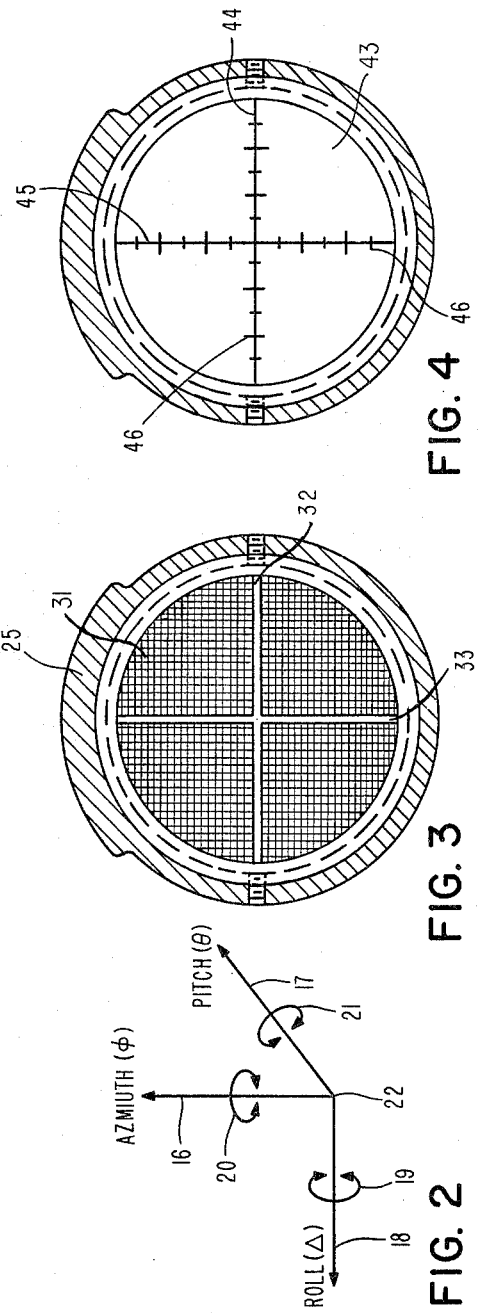
INVENTOR
RICHARD W. KERN
BY Paul D. Carmichael
ATTORNEY Sept. 27, 1966  R. W. KERN  3,274,883
OPTICAL ANGULAR ORIENTATION MEASURING SYSTEM
Filed March 15, 1961  3 Sheets-Sheet 3
FIG. 11
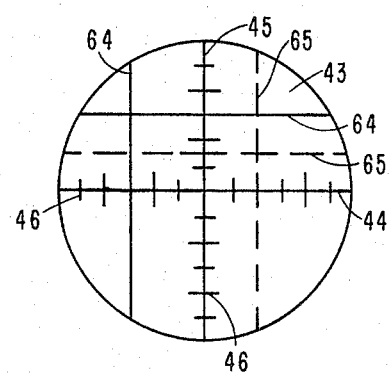
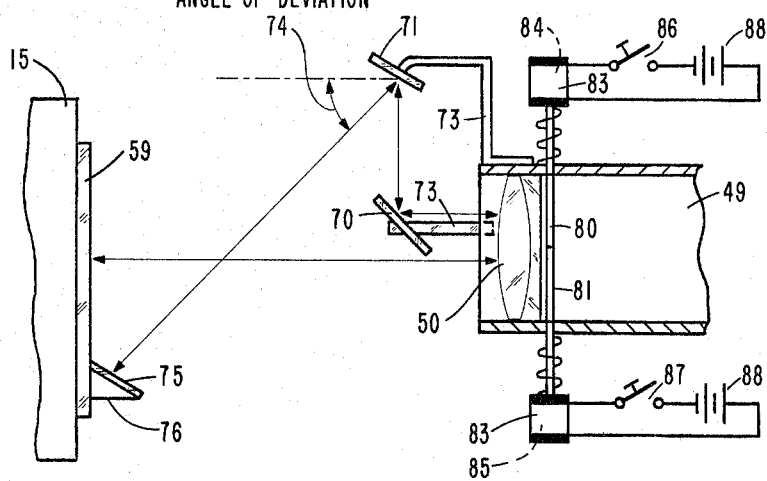
FIG. 12

United States Patent Office 3,274,883
Patented Sept. 27, 1966

3,274,883
OPTICAL ANGULAR ORIENTATION MEASURING SYSTEM
Richard W. Kern, Vestal, N.Y., assignor to International Business Machines Corporation, New York, N.Y., a corporation of New York
Filed Mar. 15, 1961, Ser. No. 95,898
7 Claims. (Cl. 88—14)

The present invention relates generally to the measuring and aligning arts and more particularly to a system for measuring the angular orientations of a physical object in space about three mutually perpendicular axes with respect to a reference point.

The position of any physical object in space can be defined with respect to a reference point by three linear coordinates and three angular coordinates corresponding to translation along and rotation about three mutually perpendicular axes which intersect at the reference point. The three angular coordinates or orientations are commonly referred to as pitch, azimuth and roll. These terms will be hereinafter more fully defined.

In many instances it is necessary to measure the angular orientations of a physical object in space. For example, an output shaft may have to be aligned in azimuth, pitch and roll with respect to an input shaft. This problem has been widely encountered in the arts and various measuring techniques have been employed. One type of prior art apparatus widely used for this purpose is the auto-collimator which is capable of aligning a work plane relative to a reference plane. The auto-collinator comprises essentially a light source which illuminates an optical object located in a focal plane of a collimator lens system. The collimated beam of light coming from the collimator lens system impinges against and is reflected from the work surface. The reflected beam is returned via the collimator lens system and a beam splitter to a readout station. The angular orientations of the work plane about any two perpendicular axes may be obtained by comparing the position of the reflected image of the optical object with respect to a set of reference crosshairs on a target or reticle. A typical auto-collimator is shown and described in the co-pending U.S. Patent Application of John Morris, Serial No. 79,725, filed December 30, 1960, and is now U.S. Patent No. 3,197,643 issued July 27, 1965, entitled, "Electro-Optical Plane Aligning Apparatus," which is assigned to the assignee of the present invention.

Auto-collimating apparatus of the above type is subject to the severe limitation that angular orientations or coordinates can only be measured about two perpendicular axes. An indication of the relative angular positions of the work plane about axes disposed normally to each other and normally to the optical axis of the optical system is obtained, but no information concerning the angular position of the work plane about an axis parallel to the optical axis of the auto-collimator is provided.

Briefly, the present invention relates to an optical measuring system wherein information concerning the angular coordinates or orientations of a physical object in space with respect to three mutually perpendicular axes is provided. The apparatus comprises auto-collimating optical means in combination with ancillary optical means capable of providing information concerning the rotative position of a physical object about a reference axis which is parallel to and in a plane normal to the optical axis of the system. An optical object located in the focal plane of a collimator lens system is illuminated by a suitable light source. The light passes through the collimator lens system to provide a collimated beam. A portion of the collimated beam passes directly to a mirror surface on the physical object in space and is reflected through the collimator lens system to provide a reflected image containing information as to the angular orientations of the physical object about two of the three mutually perpendicular axes, these two axes being at right angles to the optical axis of the optical measuring system.

The remaining portion of the collimated beam passes through the ancillary optical means which may comprise a prism fixedly mounted with respect to the collimator lens system and a second prism having a reflective coating on the rear surface thereof which is mounted for movement with the physical object in space. That portion of the collimated beam passing through the first prism is refracted at a certain angle of deviation and enters the second prism. The collimated beam of light entering the second prism is reflected and is returned through the prisms and the collimator lens system. A reflected image is provided which, when compared with the other other reflected image, provides information concerning the angular orientation of the physical object about the axis parallel to the optical axis of the optical measuring system. The prisms are mounted oppositely with respect to each other and are matched in that when all corresponding surfaces thereof are parallel the angles of deviation of the light passing through the prisms are the same. In another embodiment of the invention the ancillary optical means comprises a pair of reflecting means or mirrors mounted for movement with the physical object in space and the collimator lens system which causes a portion of the collimated light beam to be deviated by a certain angle.

Means are provided for differentiating between the two reflected images provided by the auto-collimating optical means and the ancillary optical means. Further, means are provided for correlating the reflected image from the ancillary optical means with the reflected image from the auto-collimating optical means to provide accurate information concerning angular orientation of the physical object in space in a plane normal to the optical axis of the measuring system.

It is the primary or ultimate object of this invention to provide an optical measuring system which is capable of providing information concerning the angular orientation of a physical object in space in a plane normal to the optical axis of the system.

Another object of the invention is to provide an optical measuring system capable of measuring the angular orientations of a physical object in space about three mutually perpendicular axes.

Yet another object of the invention is to provide an optical measuring system which comprises conventional auto-collimating optical means in combination with an ancillary optical means for measuring the movements of a physical object about three mutually perpendicular axes. This ancillary apparatus may comprise a pair of matched prisms. One of these prisms is fixedly mounted with respect to the collimator lens system while the other of these prisms is movable with the physical object in space.

A further object of the invention is to provide apparatus of the character above described which comprises means for differentiating between returns from the auto-collimating optical means and the ancillary optical means. This means may comprise color sensitive material associated with the optical means whereby the reflected images are different in color or shutter means to allow selective and alternate use of the auto-collimating optical means and the ancillary optical means, for example.

A further object of the invention is to provide an optical measuring system which allows easy determination of the angular orientations of a physical object in space with respect to three mutually perpendicular axes. The reflected image from the ancillary optical means is deflected by movements of the physical object in azimuth and pitch. However, the deflections of the reflected images are inter-related in such a manner that the angular orientation in roll of the physical object in space is quickly and easily calculated.

Still a further object of this invention is to provide apparatus for measuring the angular orientations of a physical object in space which is characterized by its simplicity in construction and operation, small size and great accuracy. Conventional auto-collimators can be modified to incorporate the teachings of the present invention with a minimum of expense and effort.

The foregoing and other objects, features and advantages of the invention will be apparent from the following more particular description of preferred embodiments of the invention as illustrated in the accompanying drawings.

In the drawings:

FIGURE 1 is a longitudinal side sectional view of an optical measuring system constructed in accordance with the teachings of this invention;

FIGURE 2 is a schematic perspective view illustrating and defining the angular orientations or coordinates of pitch, azimuth and roll;

Figure 5:
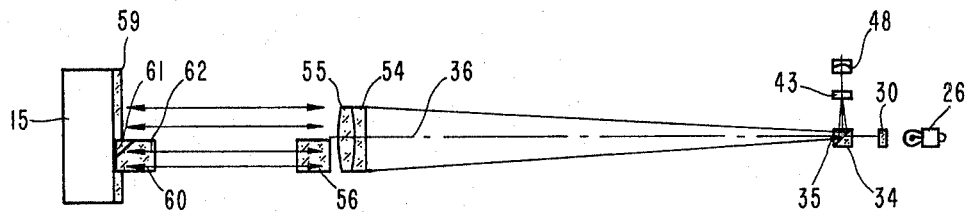
Figure 6:
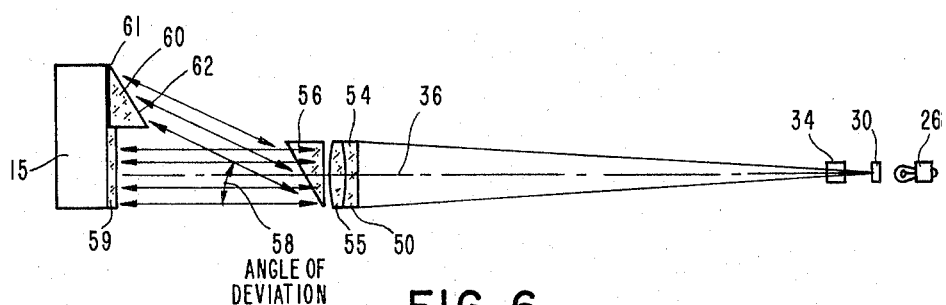

FIGURES 3 and 4 are end sectional views taken along the section lines 3—3 and 4—4 of FIGURE 1 showing the optical object assembly and the target assembly, respectively;

FIGURES 5 and 6 are schematic side and plan views of the optical system employed in the apparatus of FIGURE 1;

FIGURES 7–11 are views similar to FIGURE 4 showing the relative positions of the reflected images for certain angular orientations of the physical object in space; and FIGURE 12 is a fragmentary side sectional view of a second embodiment of an optical measuring system of this invention.

Referring now to the drawings, and initially to FIGURES 1–11, there is shown a first embodiment of an optical measuring system constructed in accordance with the teachings of the present invention. The reference numeral 10 designates generally the main portion of this optical measuring system which is rigidly mounted by a bracket 11 from a reference surface 12. A physical object 15 is supported in space by any suitable means, not shown, in front of the fixed portion 10 of the optical system. It is a function of the optical measuring system to measure the angular orientations or coordinates of the physical object 15 with respect to three mutually perpendicular axes.

In FIGURE 2 of the drawings there are shown three mutually perpendicular axes 16, 17 and 18. The axis 18 corresponds to the horizontal extent of the reference surface 12. By definition, an angular rotation in either direction about, or in a plane normal to, the axis 18 as indicated by the arrow 19 is roll and is symbolized by the Greek letter Δ. The axis 18 extends in a direction parallel to the optical axis of the measuring system as will be hereinafter more fully apparent. Movements about the axes 16 and 17 as indicated by arrows 20 and 21, respectively, are defined as angular rotations in azimuth ($\phi$) and pitch ($\theta$). The rotative position of any object can be defined in terms of its azimuth, pitch and roll coordinates with respect to the point of intersection 22 of the three mutually perpendicular axes 16, 17 and 18. The sign of the angular coordinates will be determined by the directions of rotation about the axes 16, 17 and 18. A positive angular movement is defined as a clockwise rotation about any of these axes when looking therealong from the point of intersection 22. Conversely, a counterclockwise movement about one of the axes 16, 17 or 18 defines a negative $\phi$, $\theta$ or Δ angular coordinate. A conventional auto-collimator as disclosed in the above-mentioned Morris application is operative to provide information concerning only the azimuth and pitch angular coordinates of a physical object in space while the apparatus of the present invention provides information concerning all three angular orientations.

The main portion 10 of the optical system comprises a lamp housing 24 which is attached to the rear end of a main housing 25. Mounted in the lamp housing 24 is an electric lamp 26 which defines a balanced source of light. Conductors 27 extend from the rear end of the lamp housing 24 for connection with a suitable source of electrical power, not shown, whereby the electric lamp 26 may be energized. Clamped between the lamp housing 24 and the main housing 25 is an optical object assembly 30 which, as shown in FIGURE 3 of the drawings, comprises a dark circular plate 31 having transparent horizontal and vertical lines 32 and 33 etched or otherwise formed thereon. The lines 32 and 33 define crosshairs and are illuminated by the electric lamp 26 to provide an optical object for the measuring system.

Rigidly mounted within the main housing 25 is a beam splitting prism 34 having a partially transparent beam splitting surface 35 which is disposed at an angle of forty-five degrees with respect to the horizontal and the optical axis 36 of the measuring system. The arrangement is such that a portion of the light emanating from the electric lamp 26 and optical object assembly 30 passes through the beam splitter 34 and along optical axis 36 while the other half of the light is deflected outwardly at an angle of ninety degrees with respect thereto.

Attached to the main housing 25 is an annular housing 40 which mounts an optical viewing assembly 41 and a target assembly 42. The target assembly is clamped between the annular housing 40 and the main housing 25 and comprises, as shown in FIGURE 4 of the drawings, a generally transparent plate or reticle 43 marked with reference crosshairs 44 and 45 and reference indicia 46 indicating angular displacement. The reference crosshairs 44 and 45 provide a basis for the comparison of the reflected images as will be more fully explained. The optical viewing assembly 41 comprises an eyecup 47 and suitable magnifying lens 48 which is focused on the reticle 43 so that the same may be observed by an operator.

Mounted on the main housing 25 is a cylindrical tube 49 which carries a collimator lens system 50 at the forward end thereof. Annular stray light baffles 51 are disposed longitudinally along the cylindrical tube 49. The collimator lens system 50 is supported within the cylindrical tube 49 by an annular lens holder 53 and comprises a doublet defined by a concave lens 54 and a convex lens 55. The collimator lens system 50 receives the light passing along the optical axis 36 from the beam splitting prism 34 and provides a collimated beam output. Each portion of the collimated beam contains information corresponding to the optical object defined by the crosshairs 32 and 33 of the optical object assembly 30. The collimated beam of light would form an image of these crosshairs at infinity. However, this collimated beam is directed against the physical object 15 which is located a finite distance from the collimator lens system 50. The target or reticle 43 and the optical object assembly 30 are both equally spaced from the collimator lens system and are located at the focal planes thereof.

A prism assembly 56 is mounted by an annular retaining ring 57 at the extreme outer end of the cylindrical tube 49 in closely spaced longitudinal relation with respect to the collimator lens system 50. The prism assembly 56 is formed to a proper shape from a material having a desired index of refraction whereby that portion of the collimated beam of light entering the same is deflected at a predetermined angle 58, c.f., FIG. 6, with respect to the horizontal or optical axis 36 of this measuring system. This angle is known as the angle of deviation and is designated by the reference indicium $d$.

As shown in FIGURE 5 of the drawings, the prism assembly 56 is smaller than the collimator lens system 50. In other words, for reasons to be later explained, the prism assembly 56 extends over only a portion of the forward surface area of the collimator lens system 50 and receives only a portion of the collimated beam of light issuing therefrom.

The physical body 15 is provided with a reflecting or mirror surface 59 adjacent the main portion of the optical measuring system. Mounted on physical object 15 is a prism assembly 60 having a reflective coating 61 on the rear surface thereof. The prism assembly 60 is positioned to receive the major portion of the collimated beam passing through the prism assembly 56. The prism assemblies 56 and 60 are matched—that is, light passing through one of these prism assemblies will be deviated through an angle equal to the angle of deviation of light passing through the other of the prism assemblies. The prism assemblies are oppositely mounted whereby the corresponding surfaces thereof are parallel when the physical object is aligned in azimuth, pitch and roll with respect to the optical measuring system.

The front surface of the prism assembly 60 is coated with a color selective reflecting or dichroic material 62. The material 62 acts in such a manner that certain wave lengths of the portion of the collimated beam passing through the prism assemblies 56 and 60 are absorbed to a greater extent than other wave lengths thereof. The reflected image returned to the reticle 43 via the prism assemblies 56 and 60, the collimator lens system 50 and the beam splitting prism 34 will be a different color than the reflected image coming from the unrefracted portion of the collimated light beam. The material 62 may be of any type suitable for accomplishing the above purpose such as, for example, a multi-layer structure of lead sulphide and magnesium fluoride.

The portion of the collimated light beam coming from the collimator lens system 50 which does not pass through the prism assemblies 56 and 60 impinges directly on the mirror surface 59 of the physical object 15 and is reflected. The reflection is passed back through the collimator lens system 50 and beam splitting prism 34 to define a reflected image which is projected on the reticle 43. The reflected image coming from the unrefracted portion of the collimated beam contains information concerning the angular orientations of the physical object 15 in pitch and azimuth while the reflected image from that portion of the collimated beam passing through the prism assemblies 56 and 60 is, in combination with the other reflected image, indicative of the angular orientation of the physical object 15 in roll.

The operation of the apparatus above described will now be considered with reference to FIGS. 7–11. It will be assumed that initially the physical object 15 is aligned with respect to the main portion 10 of the optical measuring system and is not rotated in azimuth, pitch or roll. Two sets of crosshairs 64 and 65 will appear as reflected images on the reticle 43 when looking at the same through the optical viewing assembly 41. The first set of crosshairs 64 comes from the unrefracted portion of the collimated beam while the second set of crosshairs 65 comes from the portion of the collimated beam which passes through the prism assemblies 56 and 60. As previously explained, the dichroic material 62 causes the reflected crosshairs 65 to be of a different color than the reflected crosshairs 64. To indicate this difference of color the reflected crosshairs 65 are represented by broken lines in FIGURES 7–11 of the drawings.

Figure 7:
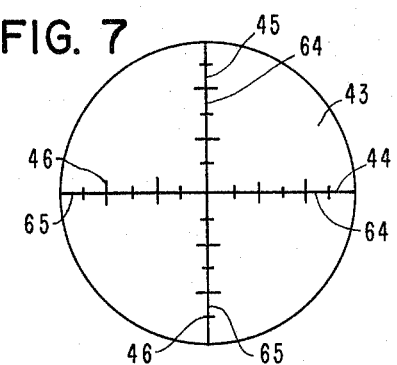

In the above initial condition the crosshairs 64 and 65 will be superimposed upon the reference crosshairs 44 and 45. This indicates that the physical object 15 is precisely and accurately aligned in azimuth, pitch and roll with respect to the main portion of the optical measuring system. The appearance of the reticle 43 at the time of alignment is shown in FIGURE 7 of the drawings.

Figure 8:
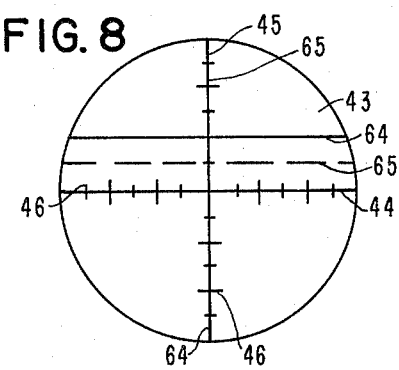

If the physical object 15 is now rotated through a small azimuth angle, the horizontal line of the reflected crosshairs 64 will move vertically by an amount directly proportional to the angular rotation of the physical object in azimuth. The extent of angular rotation can be determined directly by observing the vertical portion of the horizontal line of the reflected crosshairs 64 with respect to the reference indicia 46 on the reticle 43. The horizontal line of the reflected crosshairs 65 associated with that portion of the collimated beam passing through the prism assemblies 56 and 60 will also be displaced vertically. However, the horizontal lines of the crosshairs 64 and 65 are easily distinguished due to their difference in color. The vertical lines of the reflected crosshairs 64 and 65 will be superimposed upon the reference crosshairs 45 on the reticle 43. This is shown in FIGURE 8 of the drawings.

Figure 9:
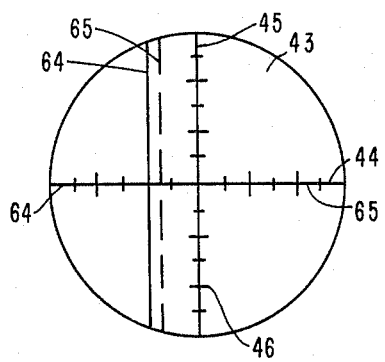

FIGURE 9 illustrates the appearance of the target or reticle 43 when the physical object 15 has been rotated through a small angle in pitch from the aligned position. The horizontal lines of the crosshairs 64 and 65 are superimposed upon the horizontal reference crosshair 44. The vertical line of the reflected crosshairs 64 associated with the unrefracted portion of the collimated beam is deflected horizontally by an amount directly proportional to the angular coordinate or orientation of the physical object in pitch. The pitch coordinate of the physical object 15 is obtained by observing the position of the vertical line of the reflected crosshairs 64 with respect to the reference indicia 46. The vertical line of the reflected crosshairs 65 is also deflected horizontally by an amount which is a function of the angle of deviation of that portion of the collimated light beam passing through the prism assemblies 56 and 60. The relationship between the movements of the vertical lines of the crosshairs 64 and 65 will be hereinafter more fully explained.

Figure 10:
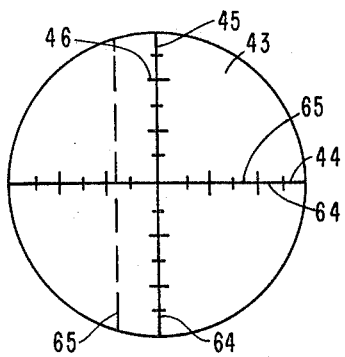

When the physical object is rotated only in roll (about the axis 18 which is parallel to the optical axis 36 of the measuring system), the crosshairs 64 will remain superimposed upon the crosshairs 44 and 45. The vertical line of the reflected image of the optical object coming from that portion of the collimated beam passing through the prism assemblies 56 and 60 will be deflected. The vertical line of the crosshairs 65 will move as the physical object is rotated about the axis 18 while the horizontal line of the crosshairs will remain superimposed upon the reference crosshair 44 and the horizontal line of crosshairs 64. This is shown in FIGURE 10 of the drawings.

FIGURE 11 shows the appearance of the target or reticle 43 when the physical object has been angularly moved in azimuth, pitch and roll about the three mutually perpendicular axes 16, 17 and 18. The horizontal and vertical lines of the crosshairs 64 and 65 are all displaced from the reference crosshairs 44 and 45. The azimuth coordinate of the physical object is obtained by noting the vertical deflection of the horizontal line of the crosshairs 64. In a similar manner, the pitch coordinate is obtained by noting the horizontal deflection of the vertical line of the crosshairs 64. The deflections of the vertical and horizontal lines of the crosshairs 64 are directly proportional to the angular orientations of the physical object 15 in pitch and azimuth, respectively. The reflected image defining the crosshairs 64 comes from that portion of the collimated beam of light impinging directly against the mirror surface 59 of the physical object.

The roll coordinate of the physical object is obtained by a comparison of the relative positions of the crosshairs 64 and 65 on the target or reticle 43. The deflection of the crosshairs 65 is not directly dependent on or proportional to the movement of the physical body in roll but rather is inter-related with the movement of the crosshairs 64. As shown in FIGURE 8, movement of the physical object in azimuth alone causes a vertical deflection of the horizontal line of the crosshairs 65. In a similar manner, as shown in FIGURE 9, movement of the physical object in pitch alone causes a horizontal deflection of the vertical lines of crosshairs 64 and 65. The relationship between the movement of the vertical line of the crosshairs 64 (corresponding to pitch) and the vertical line of the crosshairs 65 is such that the roll orientation of the physical object 15 is easily obtained. The roll coordinate can be determined to a high degree of accuracy by the following equation:

(1)
$$\Delta = \frac{\theta \cos d - \text{present position of vertical line of crosshairs } 65}{\sin d}$$

The roll coordinate of the physical object can be determined by observing the deflection of the vertical line of crosshairs 64 (pitch) and multiplying this reading by the cosine of the angle of deviation 58' for that portion of the collimated beam of light passing through the prism assemblies 56 and 60. This product represents the point where the vertical line of the crosshairs 65 would be if the physical object had zero roll and defines the new zero position for the vertical line of crosshairs 65 for the particular orientation in pitch of the physical object.

The subtraction defined in the above equation—the difference between the new zero position and the position of the vertical line of crosshairs 65—provides a quantity which is equal to the deflection of the vertical line of the crosshairs 65 that has taken place due to angular movement of the physical object in roll. This quantity is divided by the sine of the angle of deviation 58 to obtain the actual roll coordinate of the physical object. The sensitivities of the auto-collimating means and the ancillary optical means of the optical measuring system are different. In other words, the crosshairs 65 will be deflected to a lesser extent than crosshairs 64 when the physical object is moved through equal angles of pitch, azimuth and roll in the same direction. The movements or deflections of the reflected images defining the crosshairs 64 and 65 are related in a manner proportional to the sine and cosine of the angle of deviation 58. It is only necessary to divide the difference quantity in the above equation by the sensitivity factor or sine of the angle of deviation $d$ to obtain the roll reading.

The sensitivity of the vertical line of the crosshairs 65 that is reflected through the prism assemblies 56 and 60 with respect to the sensitivity of the vertical line of the crosshairs 64 is directly proportional to the sine of the angle of deviation $d$. Thus, as the angle of deviation becomes larger, the sensitivity of the vertical line of the crosshairs 65 will increase. Conversely, as the angle of deviation becomes smaller, the sensitivity of the vertical line of the crosshairs 65 will decrease. It is noted that when the pitch coordinate of the physical object is zero, the roll orientation is equal to the deflection of the vertical line of the crosshairs 65 divided by the sensitivity factor. However, the sensitivity or the amount or deflection of the vertical line of the crosshairs 64 is dependent upon the cosine of the angle of deviation $d$ as set forth in the above equation.

The angle of deviation is selected to provide the results desired in any particular application. The angle of deviation is dependent upon the shape of the prisms and the refractive indices thereof as is well known in the optical arts. These parameters may be varied to obtain the desired angle of deviation.

As previously explained, the prism assembly 60 is coated with a color selective reflecting or dichroic material 62 whereby the reflected crosshairs 65 are a different color than the reflected crosshairs 64. Other means can be employed for distinguishing the crosshairs 64 and 65. For example, the dichroic material may be placed over the prism assembly 56, half of the collimator lens system 50, portions of the mirror surface 59 or various combinations of the above. The arrangement is such that the reflected images of the optical object are different in color and easily distinguished.

The prism assemblies 56 and 60 can be rotated ninety degrees about the optical axis 36 from the positions shown in the drawings. In this event the horizontal lines of the crosshairs 64 and 65 would be related in accordance with Equation 1 above. The roll coordinate would be determined from the relative deflections of the horizontal lines of the sets of crosshairs rather than the relative deflections of the vertical lines thereof. Also, if desired, the prism assemblies 56 and 60 may include achromatic portions whereby these optical elements emit parallel light beams for all wave lengths. Alternately, a monochromatic light source may be used in place of electric lamp 26.

Referring now to FIGURE 12 of the drawings, there is shown another embodiment of an optical measuring system constructed in accordance with the teachings of the present invention. To avoid repetition in the specification, like reference numerals have been used to designate like component parts in all figures of the drawings. Those parts previously described in connection with the first embodiment that are employed in the embodiment shown in FIGURE 12 will not be further described. Only the forward end of the main portion 10 of the optical measuring system and the physical object 15 are shown.

Rigidly mounted in front of the collimator lens system 50 are a pair of mirrors 70 and 71. The mirrors 70 and 71 are rigidly mounted with respect to the collimator lens system by means of brackets 73 extending from the cylindrical tube 49. The mirror 70 intercepts a portion of the collimated beam of light passing from the collimator lens system and deflects it at generally right angles to the mirror 71 where it is again reflected. The arrangement is such that the reflected beam of collimated light coming from the mirror 71 is deflected through an angle of deviation 74 with respect to the optical axis 36 of the measuring system.

A mirror 75 is rigidly attached to and movable with the physical object 15. The mirror 75 is positioned so as to intercept the beam of light coming from the mirror 71. The angle 76 between the surface of the physical object 15 and the mirror 75 is the same as the angle of deviation $d$. The arrangement is such that a portion of the collimated beam of light coming from the collimator lens system 50 strikes the mirrors 70 and 71 and is deflected through a certain angle of deviation $d$. The reflections from the mirror 75 are returned via mirrors 71 and 70, collimator lens system 50 and beam splitting prism 34 to the target or reticle and define a reflected image of the optical object. This image corresponds to the crosshairs 65 in the first embodiment of the invention. The other portion of the collimated beam of light passing from the collimator lens system 50 is reflected by the mirror surface 59 of the physical object. The reflections from the mirror surface 59 provide a reflected image of the optical object on the reticle 43 which corresponds to the crosshairs 64.

Although in the embodiment of the invention the ancillary optical system comprises a plurality of mirrors rather than a pair of prism assemblies, the overall operation of the optical measuring system is the same. The movements or deflections of the vertical lines of the two reflected images are inter-related in the same manner and Equation 1 above may be used for determining the roll coordinate of the physical object 15. Regardless of the ancillary optical system employed, a portion of the collimated beam coming from the collimator lens system 50 is deflected through a certain angle of deviation. The ancillary optical means comprises a portion movable with the physical object and a portion rigidly mounted with respect to the main portion 10 of the optical measuring system. The portion which is rigidly mounted with respect to the main portion of the optical measuring system is operative to cause at least a portion of the collimated beam of light passing from the collimator lens system 50 to be deflected through a certain angle of deviation. The other portion of the ancillary optical means is adapted to intercept and reflect the light beam coming from the first-mentioned portion.

In the embodiment shown in FIGURES 1–11 of the drawings, the reflected images are distinguished from each other due to their difference in color. In the present embodiment the reflected images may be alternately displayed on the reticle to accomplish this purpose. Mounted for movement into and out of the cylindrical tube 49 are a pair of semicircular and opaque shutters 80 and 81. As shown, the shutters are disposed longitudinally between the collimator lens system 50 and the mirrors 70 and 71. The shutter 80 is adapted to intercept that portion of the collimated beam which is deflected by the mirror 70 while the shutter 81 intercepts the portion of the collimated beam that impinges against and is reflected by the mirror surface 59 of the physical object.

Each of the shutters 80 and 81 is adapted to be moved outwardly of the cylindrical tube 49 by a relay 83. The windings 84 and 85 of the relays are connected in series with switches 86 and 87 and suitable sources of electrical energy represented by batteries 88. When switch 86 is depressed the relay 83 associated with shutter 80 is energized and this shutter is withdrawn whereby the reflected image coming from the ancillary optical means is displayed on the reticle. When switch 87 is actuated the shutter 81 is retracted to permit the display of the other reflected image on the reticle. The shutters may be withdrawn from the cylindrical tube 49 alternately whereby the two reflected images are observed separately on the reticle or the shutters may be withdrawn simultaneously so that the reflected images are both presented on the reticle at the same time. The alternate presentation of the reflected images of the optical object may be desirable when the optical system is used for aligning a physical object in space with respect to a reference point. The simultaneous presentation of the reflected images may be desirable when the angular coordinates of a physical object in space are to be determined. Of course, one or all of the mirrors employed in connection with the optical system shown in FIGURE 12 may be coated with a dichroic material whereby the reflected optical images are of a different color if this is desired.

While in the disclosed embodiments of the invention the optical object has been shown to comprise a set of crosshairs, it should be understood that any other type of optical object may be employed. Also, electrical or other automatic readout means may be used for interpreting and comparing the two reflected images. The main portion of the optical measuring system may be movably mounted while the physical object serves as a reference. In essence, the optical measuring system serves as a means for determining the relative angular positions of two objects without any physical interconnection therebetween.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical system for establishing the angular orientations of a physical object with respect to three mutually perpendicular axes comprising, in combination: an auto-collimating optical means and an ancillary optical means, said auto-collimating optical means comprising a collimator lens system, an optical object positioned in a focal plane of said collimator lens system, a source of light illuminating said optical object, a beam splitting prism positioned between said optical object and said collimator lens system and adapted to intercept the light from the source, a reticle positioned in a focal plane of said collimator lens system and receiving a portion of the light passing through said beam splitting prism after said light has passed through said collimator lens system, said physical object being positioned in spaced relation with respect to said collimator lens system, a first reflective surface on said physical object for reflecting at least a portion of the collimated beam of light passing from said collimator lens system to provide a first reflected image of said optical object on said reticle, the location of said first reflected image relative to said reticle providing information concerning the orientations of said physical object about two of said axes, said ancillary optical means comprising means for deflecting a portion of said collimated beam of light passing from said collimator lens system through an angle of deviation, and a second reflective surface carried by said physical object disposed to intercept the deflected collimated beam, said second reflective surface reflecting said intercepted deflected beam in a predetermined manner to cause the beam so reflected to be directed back into said collimator lens system, said ancillary optical means providing a second reflected image of said optical object on said reticle, and the relative disposition of said second reflected image containing information concerning the angular orientation of said physical object about the third of said axes when compared with said first reflected image.

2. An optical system for establishing the angular orientations of a physical object with respect to three mutually perpendicular axes comprising, in combination: an auto-collimating optical means and an ancillary optical means, said auto-collimating optical means comprising a collimator lens system, an optical object positioned in a focal plane of said collimator lens system, a source of light illuminating said optical object and said lens system for producing a collimated beam of light, said physical object being positioned in spaced relation with respect to said collimator lens system, a first reflecting surface on said physical object for reflecting at least a portion of the collimated beam of light after passing from said collimator lens system back into said collimator lens system to provide a first reflected image of said optical object, said first reflected image providing information concerning the orientations of said physical object about two of said axes, said ancillary optical means comprising means for deflecting a portion of said collimated beam of light passing from said collimator lens system through an angle of deviation, and a second reflecting surface carried by said physical object for receiving said deviated beam, said second reflective surface reflecting said intercepted deviated beam in a predetermined manner to cause the beam so reflected to be directed back into said collimator lens system, said ancillary optical means providing a second reflected image of said optical object, and said second reflected image containing information concerning the angular orientation of said physical object about the third of said axes when compared with said first reflected image, and readout means disposed to optically relate said optical object and said first and second reflected images in a common optical field.

3. Apparatus according to claim 1 further characterized in that said ancillary optical means comprises a pair of prisms, and wherein said means for deflecting comprises one of said prisms being positioned in front of said collimator lens system, and the other of said prisms being movable with said physical object and having a predetermined surface for intercepting said second portion of said collimated beam of light coming from said one of said prisms, said second reflective surface comprising said predetermined surface of said other of said prisms.

4. Apparatus according to claim 1 further characterized in that said ancillary optical means comprises a pair of mirror means, said mirror means being angularly related with respect to the optical axis of said collimator lens system, and wherein said means for deflecting comprises one of said mirror means being positioned in front of said collimator lens system and deflecting said second portion of said collimated beam of light through said angle of deviation, and wherein said second reflective surface comprises the reflective surface of the other of said mirror means, said other of said mirror means being movable with said physical object and said second reflective surface thereof intercepting that portion of said collimated beam coming from said one of said mirror means.

5. Apparatus according to claim 1 further comprising color selective means associated with at least one of said optical means whereby said first image and said second image are of different colors.

6. Apparatus according to claim 1 further comprising opaque shutter means associated with said collimated beam for selectively occluding all of the light of said collimated beam to either the first or second reflective surfaces, and means to move said shutter means from obstructing relation with respect to said collimated beam of light and said first and second reflective surfaces.

7. A system for determining the angular disposition of a physical object relative to a set of three axes forming a reference frame, comprising;
 a source of radiant energy for directing a beam of light thereof along a first definite path;
 an optical object interruptingly located in the path of said beam;
 means disposed in the path of said beam beyond said optical object for transmitting said beam further along said first path;
 beam deflecting means disposed to receive a portion of the light beam moving along said first path from said means for transmitting for deflecting said portion along a second path;
 first reflective means carried by said object disposed to receive the undeflected portion of said beam coming from the means for transmitting and reflecting the same back along said first path to said means for transmitting to send a reflected image of said optical object along a third path;
 second reflective means carried by said physical object angularly disposed with respect to said first reflective means and located to receive the deflected beam and reflect the same back to said beam deflecting means, said beam deflecting means further deflecting the deflected beam after said deflected beam is reflected by said second reflective means back along said first path to the transmitting means, said transmitting means directing an image of said optical object along said third path;
 a reticle disposed along said third path from said transmitting means; and
 optical viewing means located along said third path beyond the reticle for presenting the reflected images of the optical object and said reticle in a single field of view whereby the relative disposition of the images to one other and the reticle represent the orientation of the physical object to the difference axes of the reference frame.

References Cited by the Examiner
UNITED STATES PATENTS

| | | | |
|---|---|---|---|
| 2,231,669 | 2/1941 | Hall | 178—5.2 |
| 2,256,804 | 9/1941 | Hurley | 88—74 X |
| 2,594,382 | 4/1952 | Bedford. | |
| 2,764,908 | 10/1956 | Hendrix et al. | 88—2.2 X |
| 2,775,158 | 12/1956 | Mitchell | 88—14 X |
| 3,012,468 | 12/1961 | Magill et al. | 88—14 |

OTHER REFERENCES

Longwell: IBM Technical Disclosure Bulletin, "An Optical Fixture," vol. 3, No. 7, December 1960.

JEWELL H. PEDERSEN, *Primary Examiner.*

EMIL G. ANDERSON, *Examiner.*

T. L. HUDSON, *Assistant Examiner.*